(12) United States Patent
Siraky et al.

(10) Patent No.: US 8,874,401 B2
(45) Date of Patent: Oct. 28, 2014

(54) PROCESS AND DEVICE FOR THE PARAMETERIZATION OF MEASURING DEVICE

(75) Inventors: Josef Siraky, Donaueschingen (DE); Willibald Stobbe, Donaueschinger (DE); Ralf Steinmann, Donaueschingen (DE)

(73) Assignee: Sick Stegmann GmbH, Donaueschingen (DE)

( * ) Notice: Subject to any disclaimer, the term of this patent is extended or adjusted under 35 U.S.C. 154(b) by 555 days.

(21) Appl. No.: 12/010,092

(22) Filed: Jan. 18, 2008

(65) Prior Publication Data

US 2008/0177494 A1   Jul. 24, 2008

(30) Foreign Application Priority Data

Jan. 19, 2007  (EP) .................................. 07 001 132

(51) Int. Cl.
  *G06F 15/00*  (2006.01)
  *H03K 17/00*  (2006.01)
  *G01D 5/244*  (2006.01)
  *G01D 3/02*  (2006.01)

(52) U.S. Cl.
  CPC ................ *G01D 3/022* (2013.01); *G01D 5/244* (2013.01)
  USPC ............. 702/122; 702/81; 702/151; 327/285; 327/404; 327/415

(58) Field of Classification Search
  CPC .................................. G01D 3/22; G01D 5/244
  USPC ............. 702/81, 122, 151; 327/285, 404, 415
  See application file for complete search history.

(56) References Cited

U.S. PATENT DOCUMENTS

| 4,212,057 | A  | * | 7/1980 | Devlin et al. | ................. 711/151 |
| 5,451,939 | A  |   | 9/1995 | Price | |
| 5,614,854 | A  | * | 3/1997 | Kuga | ............... 327/94 |
| 6,088,514 | A  |   | 7/2000 | Foreman et al. | |
| 6,320,502 | B1 | * | 11/2001 | Hagl | ............... 340/531 |
| 7,016,792 | B2 | * | 3/2006 | Schneider | ........................ 702/57 |
| 2002/0070790 | A1 | * | 6/2002 | Westerman | .................. 327/407 |
| 2003/0025525 | A1 | * | 2/2003 | Strzalkowski | .................. 326/56 |
| 2005/0122789 | A1 | * | 6/2005 | Keeth et al. | ............. 365/189.05 |

FOREIGN PATENT DOCUMENTS

| DE | 41 29 577 | 3/1993 | | |
| DE | 4129577 A1 | * | 3/1993 | ............... G01B 7/30 |
| DE | 4129577 A1 | * | 3/1993 | ............... G01B 7/30 |
| DE | 43 42 377 | 6/1995 | | |

(Continued)

OTHER PUBLICATIONS

"Essential Impedance Basics", http://www.electronics-tutorials.com/basics/impedance.htm. May 15, 2000.*

(Continued)

*Primary Examiner* — Janet Suglo
(74) *Attorney, Agent, or Firm* — Nath, Goldberg & Meyer; Jerald L. Meyer; Sanjana Mangalagiri

(57) ABSTRACT

In a measuring device, the measured data of a data recording component (10) are transmitted to an evaluating component via an output device (12). Parameters of the measuring device are stored in a memory (18). For the purpose of parameterization, parameters from the evaluating component can be stored in the memory (18) over a data cable for transmitting the measured data. To this end, the output device (12) for this data cable (Z) is operated at high impedance.

6 Claims, 2 Drawing Sheets

(56) References Cited

FOREIGN PATENT DOCUMENTS

Figure 1:
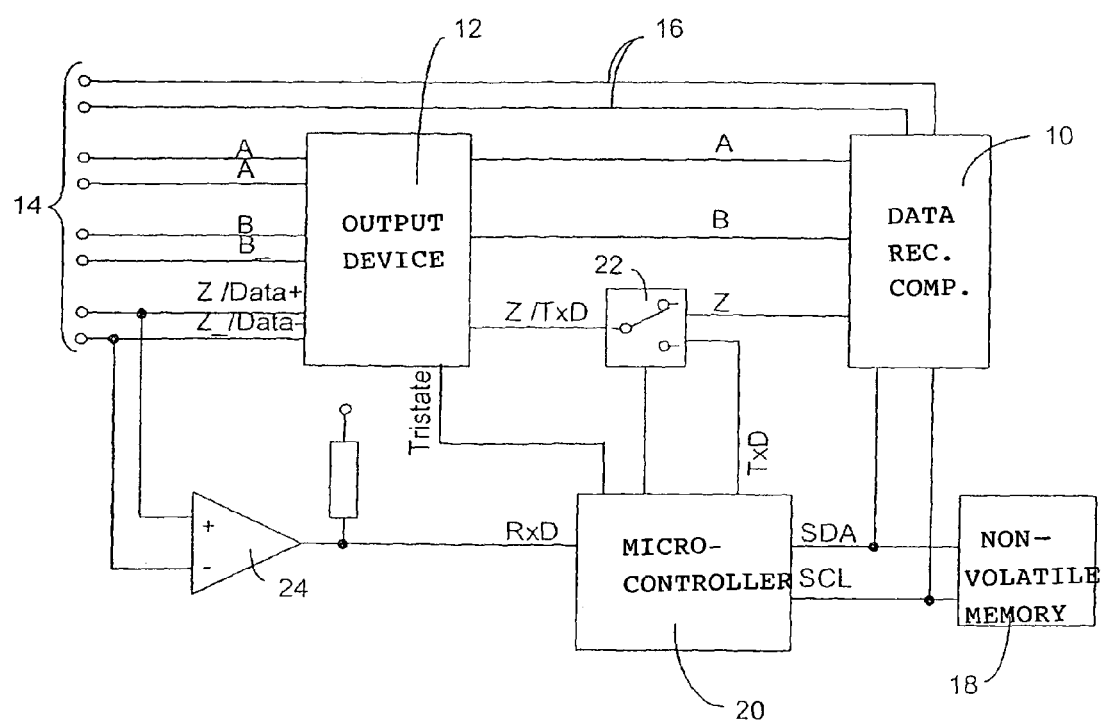

| | | | | |
|---|---|---|---|---|
| DE | 195 21 252 | | 12/1996 | |
| DE | 19521252 A1 | * | 12/1996 | ............. G08C 15/06 |
| EP | 0 790 489 | | 8/1997 | |
| EP | 0 845 660 | | 6/1998 | |
| EP | 0 866 391 | | 9/1998 | |
| JP | 9311052 A | | 12/1997 | |
| JP | 11-259408 | | 9/1999 | |
| JP | 2001167376 A | | 6/2001 | |

OTHER PUBLICATIONS

Official translation of DE4129577A1, "Measuring System for Rotation Angle Measurement" Guenther Vogt, Mar. 1993.*

* cited by examiner

PROCESS AND DEVICE FOR THE PARAMETERIZATION OF MEASURING DEVICE

The invention relates to a process for parameterization of a measuring device, in which measured data of the measuring device are transmitted over data cables, and in which parameters of the measuring device are stored in a memory, as well as to a device for parameterization of a measuring device, including a data recording component with an output device for transmitting measured data from the data recording component on data cables, and including a memory for storing parameters.

Measuring devices record measured data, e.g., position-dependent data such as position, speed, acceleration, and the like. Here the measured values may be available as incremental or absolute values, and in digital or analog form. The measured values are transmitted over data cables running from the measuring device to the processing units. To permit data from the measuring device to be processed in the processing unit, it is necessary as a rule to coordinate the parameters of the measuring device with the processing unit. Such parameters can be, e.g., measuring steps, pulse numbers, direction of rotation or motion, adjustment values, and the like. These parameters are stored in a memory belonging to the measuring device.

If the measuring device is being provided for a specific application, it is known to parameterize the device during the manufacturing process itself. If parameterization must suit different applications, however, parameterization is realized by means of a special design for the interface between the measuring device and the evaluating unit (e.g., EP 0 866 391 A1) or, if need be, by means of a special connecting plug.

The goal of the invention is to provide a process for the parameterization of a measuring device that does not require a special design for the interface and does not require additional cables.

The invention achieves this goal with a process exhibiting the features of patent claim 1 and with a device exhibiting the features of patent claim 6.

Advantageous embodiments of the invention will be clearly understood throughout the present application.

The invention's basic concept provides for the use of data cables that are present to transmit measured data for the additional parameterization of the measuring device and for the exchange of parameters between the measuring device and the evaluating unit. To this end, the data cable employed for parameterization is furnished with a so-called tri-state or disable function, i.e., this data cable can be used for high-impedance operation. This data cable is operated at high impedance for a defined period of time. During this period an examination is made to determine whether parameterization signals from the evaluating unit are queued up on the data cable. When such parameterization signals are queued up, they are received by the measuring device and, if so desired, are stored in the memory of the device. If no parameterization signals are queued up, or as soon as the transmission of parameterization signals is complete, the corresponding data cable is again operated at low impedance, with the result that measured data from the measuring device can be transmitted over this data cable.

The invention thus makes it possible to implement the parameterization process by using the existing data cables and the available interfaces or plug connectors. Parameterization can thus be performed in a versatile and individualized manner, in keeping with the demands of the application, while insuring an extremely low operating expense.

From DE 195 21 252 C2 it is known to operate the data cables of measuring devices at high impedance with a tri-state function. However, the tri-state function is used to permit a plurality of measuring devices to be connected to a common data bus or to eliminate disturbances. In the cited reference, the tri-state function is only used to prevent the output of data by the measuring device. The possibility of implementing the parameterization process by using the data cable that is cut out by the tri-state function is not known from the reference.

In a preferred embodiment of the invention, the parameters stored in the memory can also be read out over one of the data cables provided for the transmission of measured data, and transmitted to the processing unit. To this end, the parameters read out from the memory, rather than the measured data received from the measuring device, are switched to this data cable. Those parameters can be transmitted on the data cable in the same manner as the measured data.

The parameterization process will advantageously proceed in such a way that when the measuring device is turned on the appropriate data cable is operated at high impedance for a predetermined period of time. Within this period an examination is made to determine whether a parameterization request signal is present. If such a parameterization signal is identified, the device is switched into parameterization mode and the parameterization request signals are accepted and used for parameterization in a known manner, e.g., are stored in the memory. If no parameterization signal is identified in the given time period, the data cable is switched to low-impedance operation when the time period expires, with the result that the measuring device moves into normal operation and can transmit the measured data. If the device is switched into parameterization mode, termination of the parameterization mode and of the conversion of the data cable to low-impedance operation are reversed by a command transmitted with the parameterization signal.

In the following the invention is described in greater detail on the basis of the exemplary embodiment depicted in the drawing. Shown are:

FIG. 1 a circuit diagram for a measuring device, showing parameterization

Figure 2:
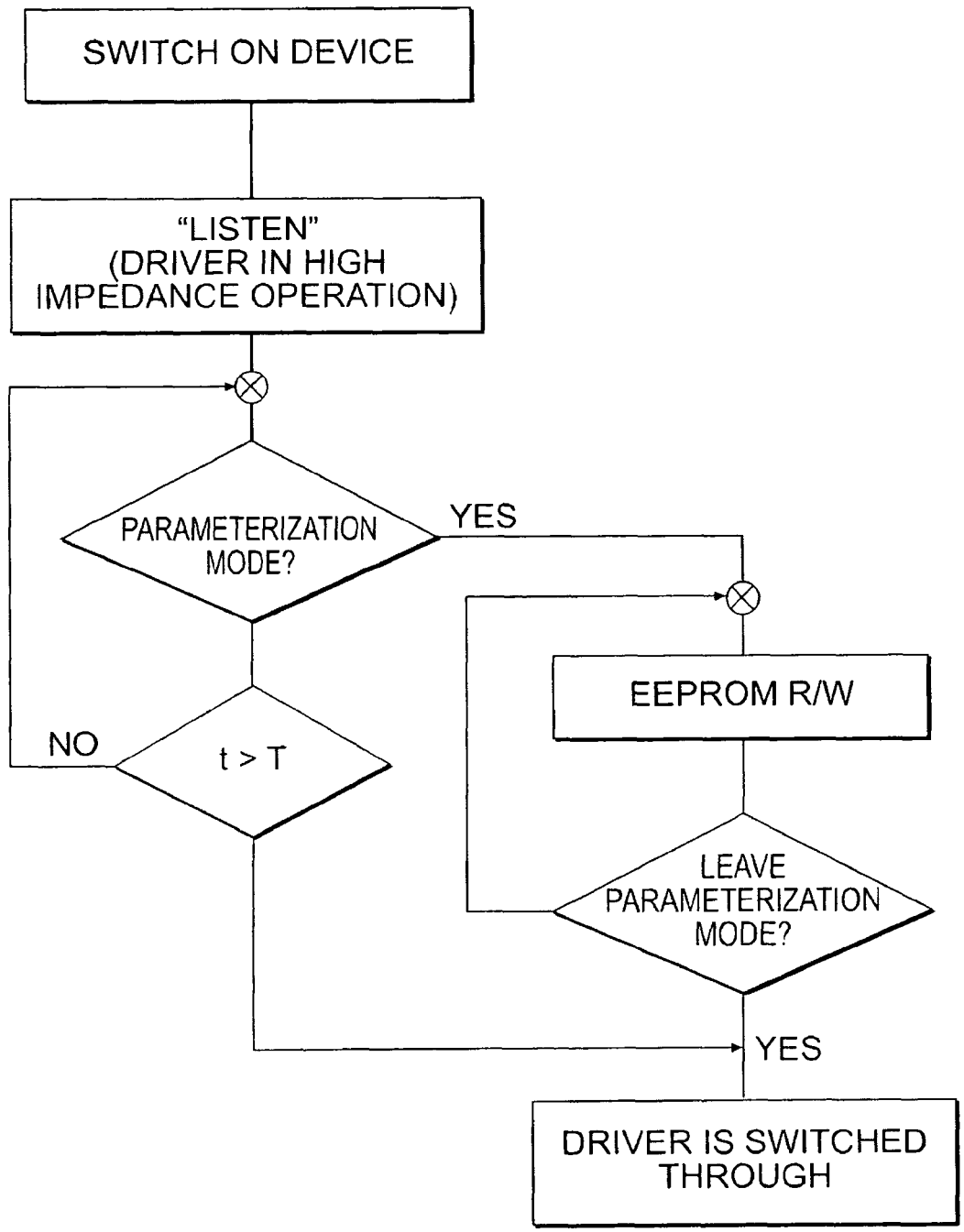

FIG. 2 a flow chart depicting the process for parameterization

The circuit diagram of FIG. 1 shows the essential elements of a measuring device using the parameterization system of the invention.

The measuring device exhibits a data recording component 10, which may be, e.g, an encoder that records the rotational angle of the object being measured. The values measured by the device 10 are fed over data cables A, B, and Z to an output device 12, which in particular exhibits drivers.

The measured data are conducted from the output device 12 over data cables A, A_, B, B_, and Z, Z_ to a plug 14, which forms the interface to an evaluating unit, which is not depicted. The power supply cables 16 for the measuring device are also fed by this plug 14. Stored in a non-volatile memory 18, which is designed specifically as an EEPROM memory, are measuring device parameters, such as pulse number, rotational direction, adjustment values, and the like. A micro-controller 20 controls the data recording component 10 and its parameterization, in accordance with the parameters stored in the memory 18. Thus far, the measuring device conforms to the prior art, so that a detailed description is not necessary.

A switch 22 is inserted into one of the data cables leading from the data recording component 10 to the output device 12. In FIG. 1, the switch 22 is inserted, e.g., into data cable Z, which transmits the zero-point signal of the encoder belonging to the data recording component 10. The switch 22 is operated by the micro-controller 20 in controlled fashion. In one of its positions—that shown in FIG. 1—the switch 22 connects the data cable Z coming from the data recording component 10 to the output device 12. In its other position the switch 22 connects a transmitting cable TxD coming from the micro-controller 20 to the output device 12. The switch 22 can thus alternately connect the data cable Z of the data recording component 10, or the transmitting cable TxD via the driver of the output device 12, to the data cables Z and Z_.

Furthermore, using a tri-state cable the micro-controller 20 can switch the output device 12, and specifically the driver for data cable Z, from normal through-put operation to high-impedance operation, so that at a minimum the data cable coming from the switch 22 is separated from the outgoing data cables Z and Z_.

Finally, the outgoing data cables Z and Z_ are connected to the micro-controller 20 over a differential amplifier 24 and a receiving cable RxD.

The measuring device shown in FIG. 1 makes possible the following functions:

1. If the micro-controller 20 switches the output device 12 and particularly the driver of data cable Z into low-impedance operation and if the switch 22 connects data cable Z coming from the data recording component 10 to the output device 12, then the measuring device will operate in measurement mode. The measured data recorded by the data recording component 10 are emitted over the plug 14 via data cables A, B, and Z, as well as via the drivers of the output device 12, in the form of inverse signal pairs passing over data cables A and A_, B and B_, and Z and Z_, and are fed to the evaluating unit. Here the measured data on data cables A and B may be, e.g., incremental signals displaced by 90° relative to each other, while a zero-point reference signal is conducted over data cable Z.

2. If the micro-controller 20 switches the output device 12 and particularly the driver of data cable Z into low-impedance operation and if the switch 22 is so operated that it connects the transmitting cable TxD to the output device 12, then parameters stored in the memory 18 can be read out by the micro-controller 20 and issued over the transmitting cable TxD, the switch 22, the output device 12, and the outgoing data cables Z, Z_, and transmitted to the evaluating unit. In this manner, the parameters of the evaluating unit stored at a given moment in the memory 18 can be communicated, thereby allowing the measuring device to identify itself to the evaluating unit.

3. If the micro-controller 20 operates the output device 12 and particularly the driver of the data cable Z at high impedance over the tri-state cable, then data cable Z is separated from the data recording component 10 or, as the case may be, from the switch 22 to the outgoing data cables Z and Z_. Parameterization signals coming from the evaluating unit as inverted signal pairs over these outgoing data cables Z and Z_ can now be fed to the micro-controller 20 via the differential amplifier 24 and the receiving cable RxD, and the micro-controller can read these signals into the memory 18 and store them there. Thus parameters stored in the memory 18 and used for parameterization of the measuring device 10 can be adjusted to the demands of the evaluating unit.

The course of parameterization is depicted in the flow diagram of FIG. 2.

When the measuring device is turned on, the micro-controller 20 operates the output device 12 at high impedance. Data cable Z or TxD, as the case may be, is thereby separated from the outgoing data cables Z and Z_. The micro-controller 20 now examines ("listens") over the receiving cable RxD to determine whether parameterization signals from the evaluating unit are queued up on the data cables Z, Z_, i.e., whether the evaluating unit is requesting parameterization or, as the case may be, desires to examine the stored parameters. If no parameterization signals are queued up, this examination is continued for a predetermined period of time T. If time period T has elapsed without the identification of a parameterization request, the micro-controller 20 puts through the output device 12 over the tri-state cable, so that measured data can be transmitted to the evaluating unit over data cables A, B, Z, and the drivers of the output device 12, as well as over the outgoing data cables A, A_, B, B_, and Z, Z_ to the evaluating unit.

If the micro-controller 20 identifies a parameterization request on data cables Z, Z_ during the predetermined time period T, the micro-controller 20 switches into parameterization mode and feeds the queued parameters to the memory 18. The micro-controller 20 keeps the output device 12 in high-impedance operation until the entire data protocol of parameters is transmitted. A command that concludes this data protocol causes the micro-controller 20 to exit the parameterization mode and to switch through the output device 12, so that the latter is able to transmit the measured data of the data recording component 10 to the evaluating unit.

In the context of this parameterization request, a query can also be made by the evaluating unit to the parameters stored in the memory 18. When there is such a command, the micro-controller 20 switches through the output device 12 over the tri-state cable and at the same time uses switch 22 to connect the transmitting cable TxD to data cable Z of the output device 12. The micro-controller 20 can now read out the parameters stored in the memory 18 and transmit them to the evaluating unit using the transmitting cable TxD, the switch 22, the through-switched output device 12, and the data cables Z, Z_.

The invention claimed is:

1. A method for parameterization of a measuring device, the device being configured to operate in three modes comprising:

transmitting measured data of the measuring device over data cables in a first mode, wherein a microcontroller operates the at least one of the data cables at low impedance and the microcontroller connects the output device to a data recording component via a switch;

storing parameters of the measuring device in a memory, reading out parameters stored in the memory, and transmitting the parameters to an evaluation unit in a second mode, wherein the microcontroller operates the at least one of the data cables at low impedance, and the microcontroller connects a transmitting cable to the output device via the switch; and supplying the parameters to the memory over at least one of the data cables, and in supplying the parameters, operating the at least one of the data cable at high impedance for a time period relative to the transmission of measured values, the microcontroller operating the at least one of the data cables at high impedance in a third mode using the tri-state cable, wherein the time period is started by turning on the measuring device, wherein the time period is terminated if no parameterization request signal presents on the at least one of the data cables after a defined period of time.

2. The method according to claim 1, wherein the time period is terminated by a command transmitted with the parameters.

3. The method according to claim 1, further comprising switching the parameters to the at least one of the data cables in place of the measured data, during which time, the at least one of data the cables is not operated at high impedance.

4. A device for parameterization of a measuring device, the measuring device comprising:
- a data recording component;
- an output device, connected to the data recording component by at least one data cable, via a switch;
- a memory, connected to the output device with a transmitting cable via the switch; and
- a microcontroller that operates the device in three modes:
  - a first mode, in which the microcontroller operates the at least one data cable at a low impedance and the microcontroller connects the output device the data recording component via the switch;
  - a second mode, in which the microcontroller operates the at least one of the data cables at low impedance, and the microcontroller connects the transmitting cable to the output device with the switch; and
  - a third mode, in which the microcontroller operates the at least one of the data cables at a high impedance over a tri-state cable for a time period,
- wherein the time period is started by turning on the measuring device, and
- wherein the time period is terminated if no parameterization request signal is received on the at least one data cable after a defined period of time.

5. The device according to claim 4, wherein the microcontroller operates the output device at high impedance over the tri-state cable, and tests for the a presence of parameter signals on the data cables running outward from the output device; and switches the output device through the data cables when there is no parameter signal present after a predetermined time period; and, when parameter signals are present, switches the output device through the data cables after completing transmission of the parameters.

6. The device according to claim 4, wherein the switch is positioned in front of the output device in the at least one of the data cables, and the switch is controlled by the a microcontroller to route to the output device either the at least one of the data cables running from the data recording component or a transmitting cable coming from the micro-controller, in an alternate fashion.

* * * * *